(12) United States Patent
Luther et al.

(10) Patent No.: US 6,332,052 B1
(45) Date of Patent: Dec. 18, 2001

(54) OPTICAL FIBER RIBBON CABLES WITH CONTROLLED BENDING BEHAVIOR

(75) Inventors: James P. Luther, Hickory, NC (US); Ranier Zimmer, Schalksmuhle (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/514,091

(22) Filed: Feb. 28, 2000

(51) Int. Cl.$^7$ ........................................... G02B 6/44
(52) U.S. Cl. ............................................... 385/114
(58) Field of Search ........................ 385/59, 76, 137, 385/86, 87, 147; 174/74 R

(56) References Cited

U.S. PATENT DOCUMENTS

| | | | |
|---|---|---|---|
| 4,070,093 | 1/1978 | Schwartz | 350/96 |
| 5,566,269 | * 10/1996 | Eberle et al. | 385/137 |
| 5,636,308 | 6/1997 | Personne et al. | 385/102 |
| 5,778,123 | * 7/1998 | Hagan et al. | 385/76 |
| 5,845,028 | * 12/1998 | Smith et al. | 385/59 |
| 6,134,370 | * 1/2000 | Childers et al. | 385/135 |

FOREIGN PATENT DOCUMENTS

| | | | |
|---|---|---|---|
| 9-197205 | 7/1997 | (JP) | G02B/6/44 |
| 10-197765 | 7/1998 | (JP) | G02B/6/44 |

\* cited by examiner

*Primary Examiner*—Akm E. Ullah
(74) *Attorney, Agent, or Firm*—Timothy J. Aberle

(57) ABSTRACT

An optical fiber ribbon cable having an overall bending behavior including an optical fiber ribbon with optical fibers generally planarly aligned along an optical ribbon plane and surrounded by a common matrix coating having lateral edge surfaces. The cable includes a cable jacket, the cable jacket including stiffening members generally aligned along a stiffening member plane generally orthogonal to the optical ribbon plane, the cable jacket includes an exterior profile having complementary surfaces. The complementary surfaces are respectively disposed adjacent the lateral edges, with respective thicknesses defined between the complementary surfaces and the lateral edge surfaces. At least one of the thicknesses is about 0 to 1,000 μm. The optical ribbon plane and the stiffening member plane comprise respective bending moduli during cable bending that contribute to the overall cable bending behavior.

11 Claims, 5 Drawing Sheets

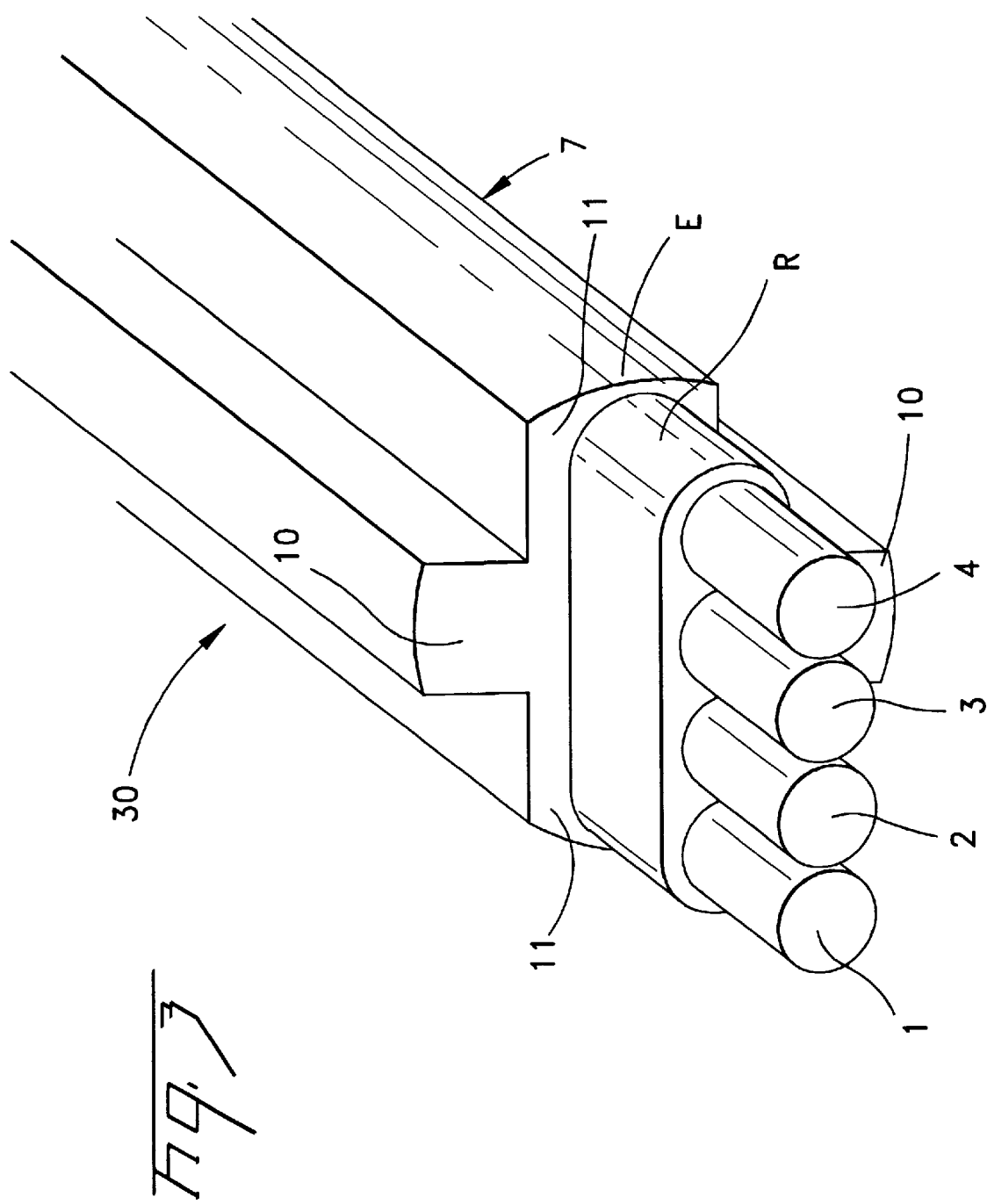

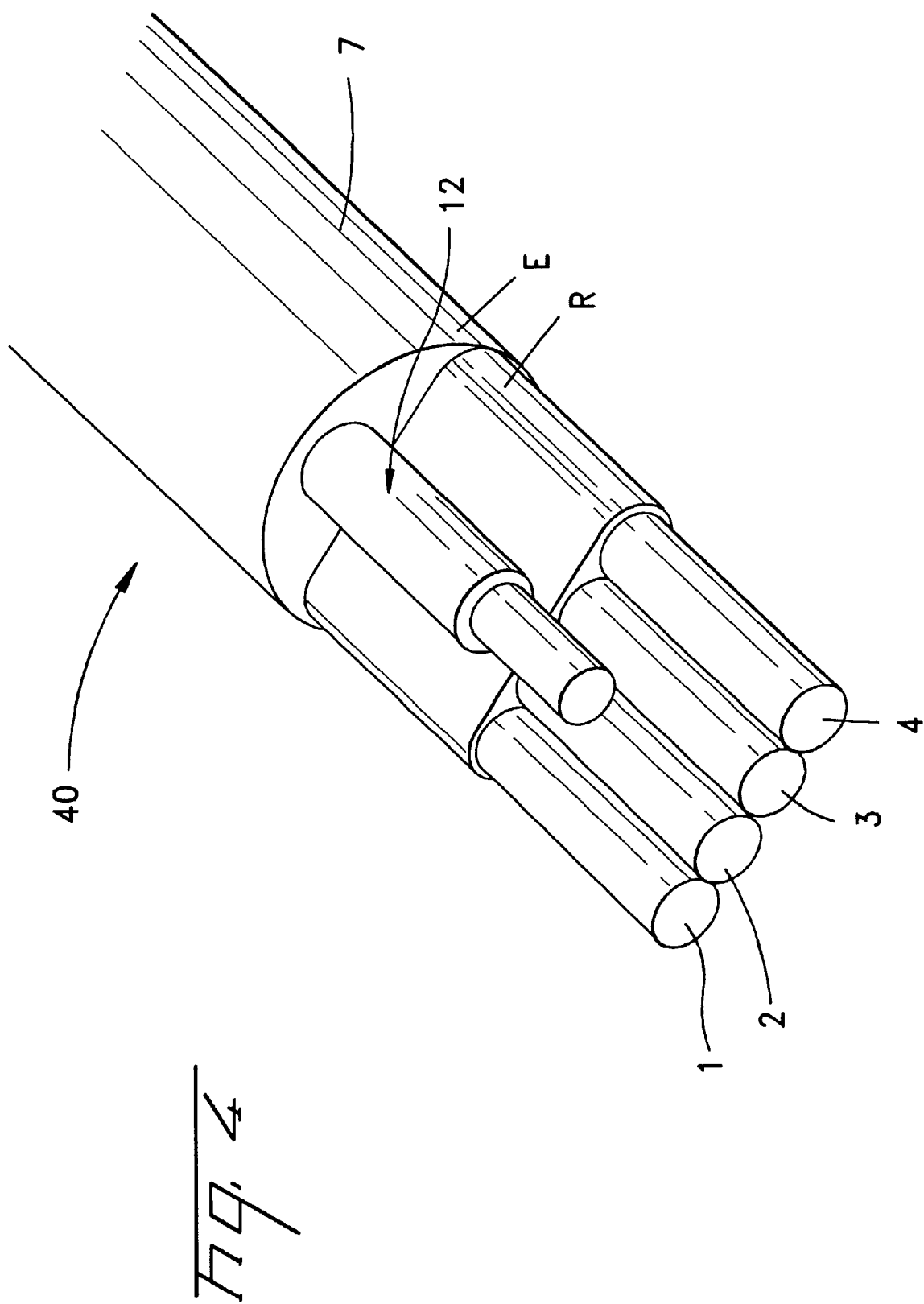

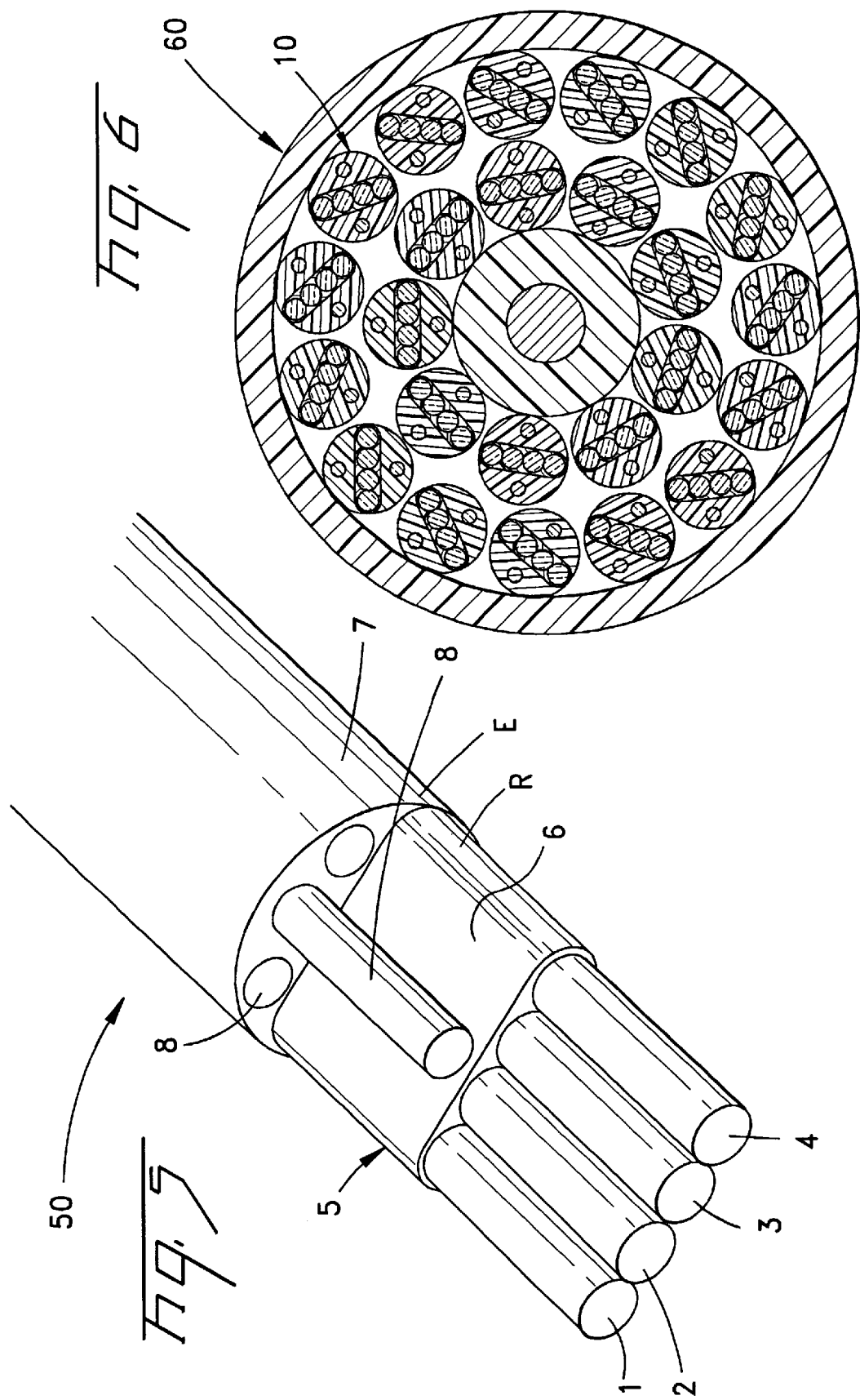

OPTICAL FIBER RIBBON CABLES WITH CONTROLLED BENDING BEHAVIOR

The present invention relates to the art of optical fiber cables and, more particularly, to optical fiber cables that include at least one optical fiber ribbon therein.

BACKGROUND OF THE INVENTION

Optical fibers are often grouped into optical fiber ribbons in which the constituent fibers are held in a predetermined spatial relationship in order to facilitate connections. The required precision of positioning normally demands that the fibers are in close proximity to each other, for example, in contact with each other or structural glass fibers that may be used as spacers. The fibers are typically arranged in a common plane with an extruded common matrix material thereover, which arrangement can limit the cross-sections of extruded plastic material because of the stresses and distortion that would arise during cooling.

Optical fiber ribbons can formed with or without sub-units. The curing of a UV radiation-curable composition suitable for use as a sub-unit or common matrix material is essentially a polymerization of the UV curable material, whereby the material undergoes a transition from a liquid to a solid. Prior to application to an optical fiber or a sub-unit, the UV curable material comprises a mixture of formulations of liquid monomers, oligomer "backbones" with, e.g., acrylate functional groups, photoinitiators, and other additives. Photoinitiators function by: absorbing energy radiated by the UV or visible light source; fragmenting into reactive species; and then initiating a polymerization or hardening reaction of the monomers and oligomers. The result is, in general, a solid network of crosslinking between the monomers and oligomers that may include fugitive components after cure. The photoinitiator therefore begins a chemical reaction that promotes the solidification of the liquid matrix to form a generally solid film having modulus characteristics.

A key to the curing process is the reaction of a photoinitiator in response to UV radiation. A photoinitiator has an inherent absorption spectrum that is conveniently measured in terms of absorbance as a function of the wavelength of the radiated light. Each photoinitiator has a characteristic photoactive region, i.e., a photoactive wavelength range (typically measured in nanometers (nm)). Commercially available photoinitiators may have a photoactive region in the vacuum ultra-violet (VUV)(160–220 nm), ultra-violet (UV)(220–400 nm), or visible light (V-light)(400–700 nm) wavelength range. When the material is irradiated by a VUV, UV or V-light lamp, that emits light in the photoactive region, the material will cure.

Optical fiber ribbons are typically flat bodies that are rather fragile and have very different bending characteristics in relation to given bending directions. In particular, optical fiber ribbons can be susceptible to damage if pressure is applied to a part of the ribbon that is so twisted that the direction of its planar thickness is out of alignment in relation to the direction of the pressure.

An example of an optical fiber ribbon is shown in JP 09-197,205-A to Noriyuki et al, that discloses an optical fiber pair enclosed in a circular jacket with a substantially increased diameter. The declared purpose is to enable the formation of cables with a high fiber density by laying the jacketed ribbons about a strength member. Another example is U.S. Pat. No. 4,070,093 to Schwartz which shows plural optical fiber ribbons enclosed in a circular-section duct forming a part of a cable structure. U.S. Pat. No. 5,636,308 to Personne et al discloses optical cable structures in which individual fibers (not forming parts of a ribbon) are enclosed in cavities of a dumbbell shape in a circular body having other cavities for strength members. A viscous fluid occupies void spaces in the cavities to provide waterproofing and ensure free movement, with the incidental effect of making it impossible for the fibers to be precisely located so that they will have to be connected separately.

BRIEF SUMMARY OF THE INVENTION

An optical fiber cable is provided having a controlled overall bending behavior. The cable of the present invention includes an optical fiber ribbon with optical fibers generally planarly aligned along an optical ribbon plane and surrounded by a common matrix coating having lateral edge surfaces. The cable includes a cable jacket, the cable jacket including stiffening members generally aligned along a stiffening member plane generally orthogonal to the optical ribbon plane, the cable jacket includes an exterior profile having complementary surfaces. The complementary surfaces are respectively disposed adjacent the lateral edges of the ribbon, with respective thicknesses defined between the complementary surfaces and the lateral edge surfaces. At least one of the thicknesses is about 0 to 1,000 $\mu$m. The optical ribbon plane and the stiffening member plane comprise respective bending moduli during cable bending that contribute to defining the overall cable bending behavior.

BRIEF DESCRIPTION OF THE DRAWINGS

FIG. 3 is an isometric view of an optical fiber ribbon cable according to a third embodiment of the present invention.

FIG. 4 is an isometric view of an optical fiber ribbon cable according to a fourth embodiment of the present invention.

FIG. 5 is an isometric view of an optical fiber ribbon cable according to a fifth embodiment of the present invention.

FIG. 6 is a cross sectional view of a fiber optic cable according to the present invention.

DETAILED DESCRIPTION OF THE INVENTION

Figure 1:
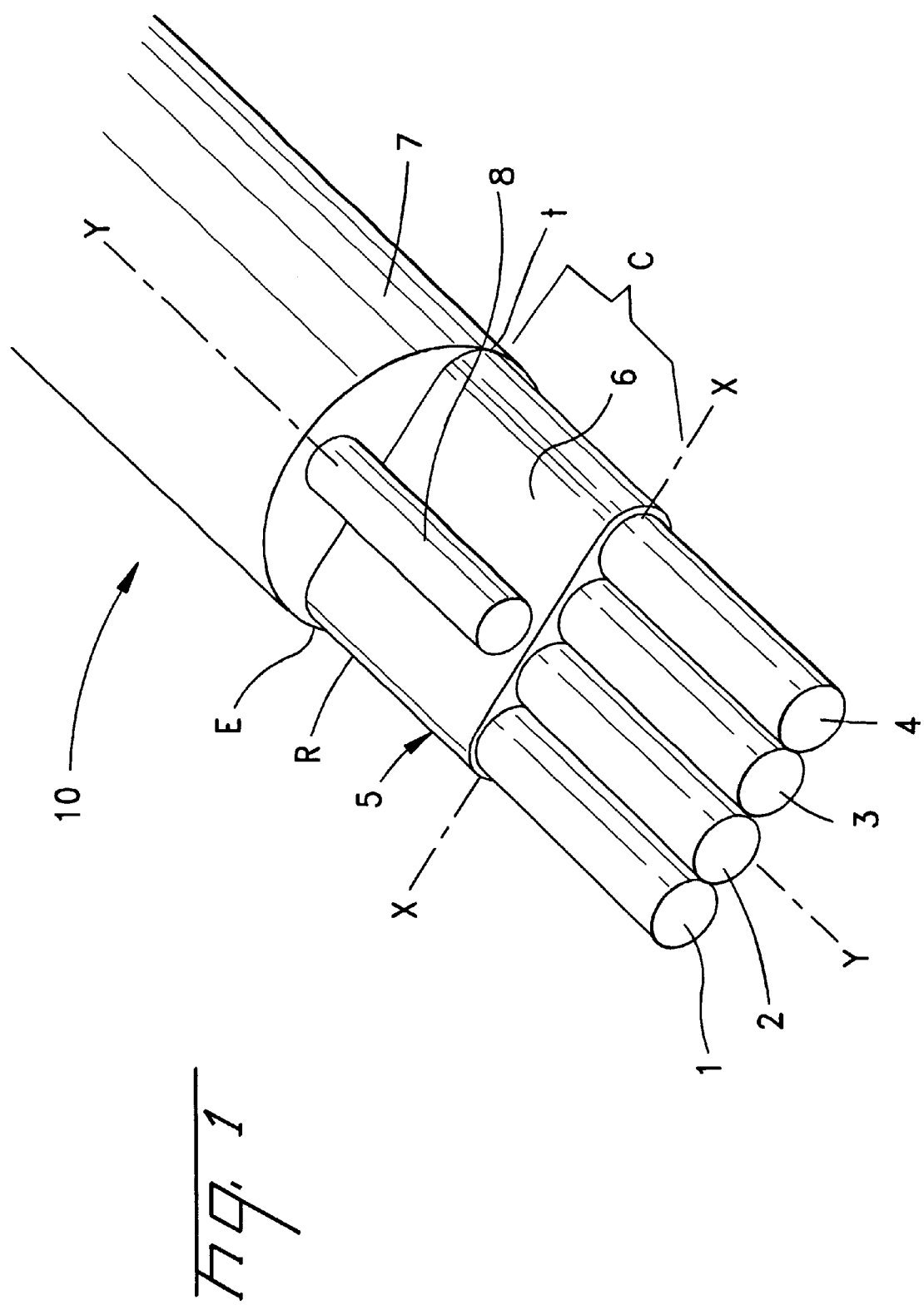
FIG. 1 an isometric view of an optical fiber ribbon cable according to a first embodiment of the present invention.

In each of FIGS. 1–6 an optical fiber ribbon cable 10 is shown, according to the present invention, comprising four fibers 1–4, at least some of which are optical fibers. For example, fibers 1 and 4 may be fully operational optical fibers and fibers 2 and 3 may be structural glass fibers of substantially the same diameter, serving to position fibers 1 and 4 accurately at the desired spacing. Preferably, at least optical fibers 1,4 include glass cores, and are single mode, multi-mode, or multi-core optical fibers. The optical and/or structural fibers are generally planarly arranged along an axis X-X (FIG. 1) incorporated by the optical ribbon plane. The fibers are preferably covered with a common matrix coating or body 5, for example, a UV curable acrylate material, having surfaces 6 that are generally parallel to the optical ribbon plane. Exemplary optical fiber ribbons that are preferred for use in the present invention comprise those disclosed in commonly assigned U.S. Pat. Nos. 5,212,756, 5,457,762, 5,485,539, 5,561,730, 5,761,363, and 5,768,460, which are all respectively incorporated by reference herein.

In accordance with an aspect of the present invention, the ribbon is enclosed by a cable jacket 7 that can be, for example, formed with a substantially circular outer profile having a controlled diameter. In other words, outer surfaces E of jacket 7 complement respective lateral edge surfaces R of the ribbon defining a thickness t (FIG. 1) of about 0–1,000 μm, more preferably about 0–250 μm, and most preferably about 0–50 μm. Thickness t and the cable jacket material can be selected so that the layer thereat is translucent for locating the optical ribbon, and/or to allow easy stripability. Thickness t can be controlled during extrusion thereof to assure mechanical and optical robustness of optical fiber ribbon cable 10. For example, thickness t can be controlled to avoid edge splitting of the ribbon, to avoid cracks or splits in jacket 7 during bending/flexing, and/or to cushion the edge fibers 1,4 from undue pressure. In addition, thickness t can be controlled so that optical fiber ribbon cable 10 will precisely register with a cable receiving aperture of an optical connector ferrule (not shown). Jacket 7 can be mechanically bonded to the ribbon for easy strippabilty therefrom. In this regard, a controlled bond or adhesive layer can be interposed between jacket 7 and the matrix material of the ribbon. Prior to connectorization, jacket 7 can be removed from an end portion of the ribbon defining a connectorization section C that can be sized for insertion into a connector or ferrule.

In another aspect of the present invention, jacket 7 alone or with components disposed therein is used to modify the bending behavior of the optical cable. For example, in a preferred embodiment, jacket 7 comprises a stiffening jacket and/or at least one but preferably at least two stiffening members 8 embedded therein. Preferably the stiffening members are aligned in an axis Y-Y (FIG. 1), that is, they are generally orthogonally disposed with respect to axis X-X, and are generally symmetrically aligned with a stiffening member plane that incorporates axis Y-Y. Stiffening members 8 can be rod-like members, e.g., structural glass fibers, metallic wires, glass or fiber reinforced plastics, or plastic impregnated fibers. The bending moduli of stiffening members 8 contribute to and are chosen to control, to the degree desired, the overall bending modulus and behavior of optical fiber ribbon cable 10 during cable bending. In this regard, stiffening members 8 can be chosen and positioned such that the principal bending moduli about axes X-X, Y-Y are essentially the same; alternatively, a differential in bending moduli may exist. In other words, where the bending moduli as determined by bending optical fiber ribbon cable 10 about axes X-X and Y-Y are essentially equal, the bending behavior of the cable is about the same during respective cable bending about the optical ribbon and the stiffening member planes. Alternatively, where the bending moduli about the optical ribbon and stiffening member planes are substantially unequal, a preferential bending characteristic will inhere in optical fiber ribbon cable 10.

Figure 2:
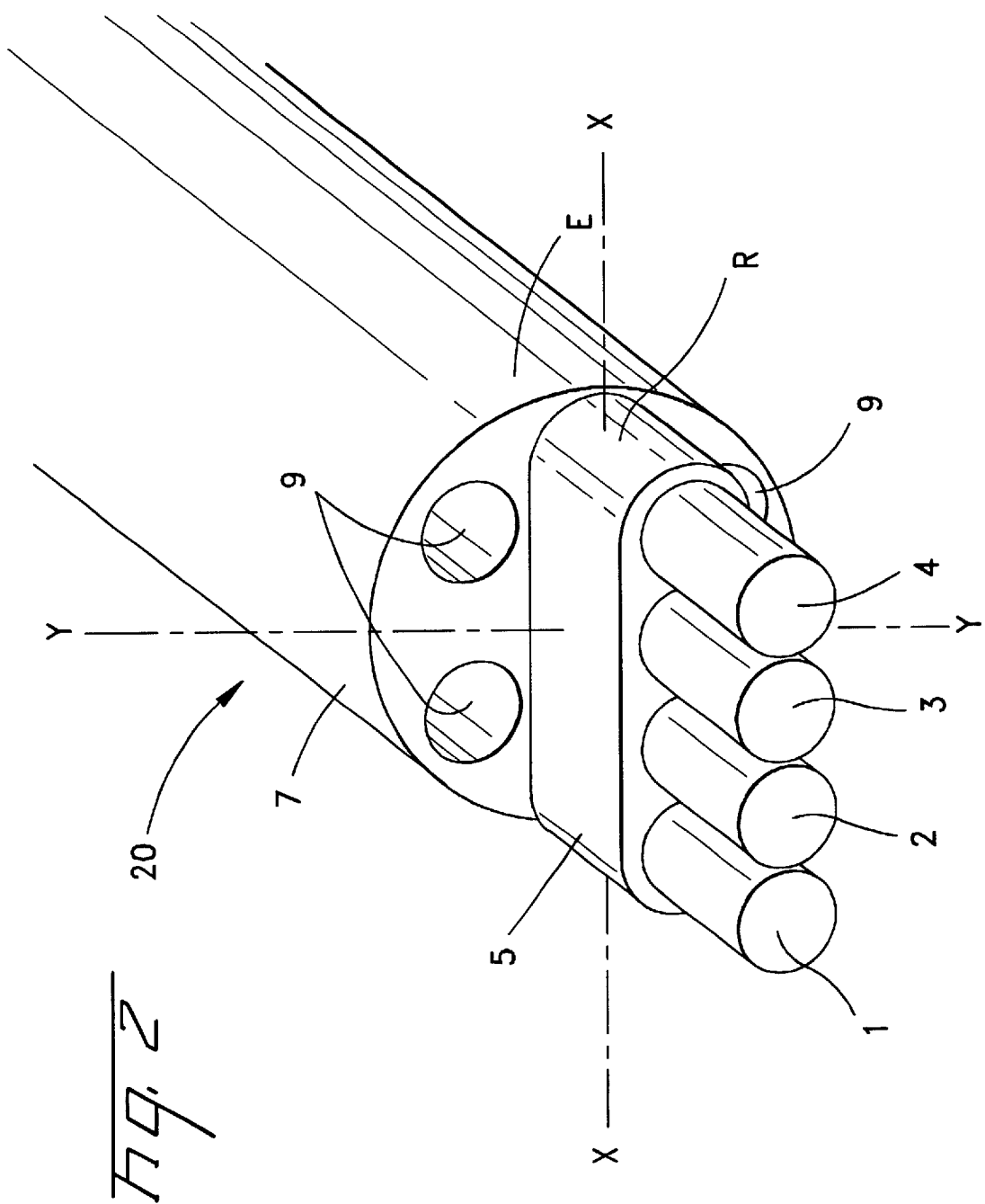
FIG. 2 is an isometric view of an optical fiber ribbon cable according to a second embodiment of the present invention.

FIG. 2 shows a second embodiment of the present invention wherein an optical fiber ribbon cable 20 comprises a stiffening jacket material, for example, a polyolefin (e.g. polyethylene) or a PVC that resists bending about axis X-X, which bending resistance is modulated by one, but preferably, at least two void spaces 9. The positions and dimensions of the voids can be chosen to equalize or create a differential between the respective bending moduli about axes X-X and Y-Y.

While it is preferred that jacket 7 comprises a substantially circular profile for ease of manufacture, other profiles could be used as well. For example, the present invention may be practiced in the form of an optical fiber ribbon cable 30 (FIG. 3) having corners or angles in the exterior profile thereof. For example, the corners can comprise right angles, e.g., defining an exemplary cruciform shape with arms 10,10 and ribs 11,11 having a controlled bending behavior as in the foregoing embodiments. The corners or angles can be used for anti-rotation and polarization with respect to a connector. In this regard, the angles, corers, and/or arms or ribs can describe an asymmetrical profile about axis X-X, while maintaining the desired overall cable bending characteristics. The fiber assemblies described may be incorporated into any appropriate kind of optical cable structure, for example, a fan-out cable 60 (FIG. 6).

The present invention has thus been described with reference to the foregoing embodiments, which embodiments are intended to be illustrative of the present inventive concepts rather than limiting. Persons of ordinary skill in the art will appreciate that variations and modifications of the foregoing embodiments can be made without departing from the scope of the appended claims. For example, stiffening members 8 and voids 9 can if desired be used in the same assembly, as illustrated by FIG. 5. Other bend modulus controlling shapes that be considered include oval, square, octagonal, or H or double-H sections. Stiffening members 8, when present, may serve additional functions: in particular (as illustrated by embodiment 40 of FIG. 4) metallic stiffening members may constitute electric conductors 12. Thickness t can be extended to about 2,000 μm. The optical fiber ribbon may include ribbons with more or less than four optical fibers, e.g., a 12 fiber ribbon, and can include optical ribbon sub-units encased in a common matrix material.

Accordingly, what is claimed is:

1. A fiber optic ribbon cable having an overall bending behavior, comprising:

an optical fiber ribbon having optical fibers generally planarly aligned with an optical ribbon plane and surrounded by a common matrix coating having lateral edge surfaces;

a cable jacket, said cable jacket including stiffening members generally aligned with a stiffening member plane generally orthogonal to said optical ribbon plane, said cable jacket comprising an exterior profile having complementary surfaces;

said complementary surfaces being respectively disposed adjacent said lateral edges, respective thickness defined between said complementary surfaces and said lateral edge surfaces, at least one of said thickness being about 0 to 1,000 μm; and, said optical ribbon plane and said stiffening member plane comprise respective bending moduli during cable bending that each contribute to said overall cable bending behavior.

2. The fiber optic ribbon cable of claim 1, said bending moduli being substantially equal whereby said bending behavior is about the same during cable bending about said optical ribbon and said stiffening member planes.

3. The fiber optic ribbon cable of claim 1, said bending moduli being substantially unequal whereby a preferential bending characteristic inheres in said fiber optic cable.

4. The fiber optic ribbon cable of claim 1, wherein at least one of said stiffening members is selected from the group consisting of a stiff cable jacket with at least one void therein, structural glass fibers, metallic wires, glass or fiber reinforced plastics, and plastic impregnated fibers.

5. The fiber optic ribbon cable of claim 1, wherein said thickness is about 0 to 250 μm.

6. The fiber optic ribbon cable of claim 1, wherein said thickness is about 0 to 50 μm.

7. The fiber optic ribbon cable of claim 1, said outer profile including corners.

8. The fiber optic ribbon cable of claim 7, said corners defining a cruciform shape.

9. The fiber optic ribbon cable of claim 7, said corners comprising right angles.

10. The fiber optic ribbon cable of claim 7, said corners defining ribs.

11. The fiber optic ribbon cable of claim 1, wherein said jacket itself comprises a stiffening member and includes at least one void therein.

* * * * *